July 4, 1950  F. H. SLAYMAKER ET AL  2,514,344
ADJUSTABLE ACOUSTIC IMPEDANCE
Filed July 10, 1944  5 Sheets-Sheet 1

*INVENTOR.*
FRANK H. SLAYMAKER
BY WILLARD F. MEEKER
*ATTORNEY*

July 4, 1950  F. H. SLAYMAKER ET AL  2,514,344
ADJUSTABLE ACOUSTIC IMPEDANCE
Filed July 10, 1944                                     5 Sheets-Sheet 2
FIG. 5
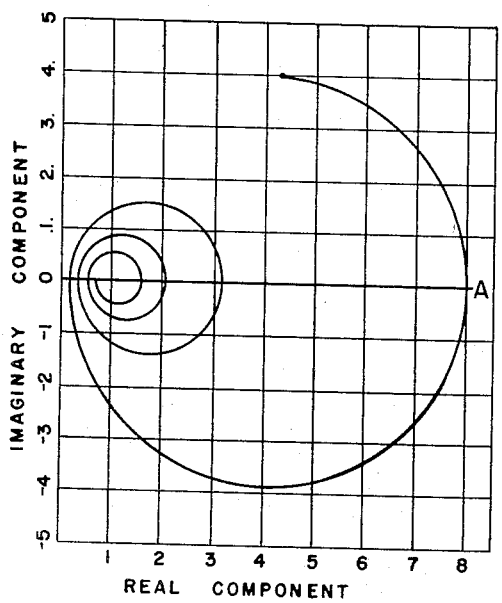
FIG. 6
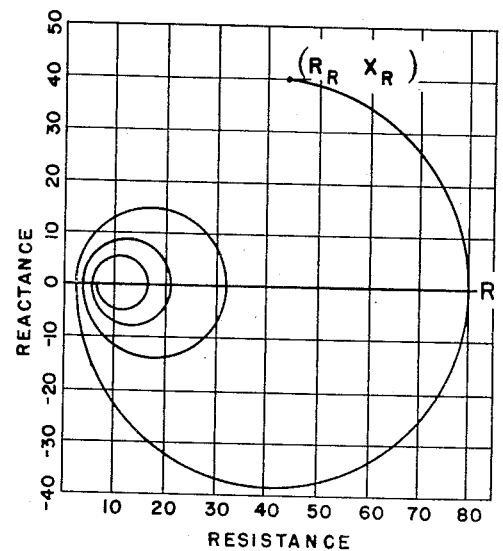
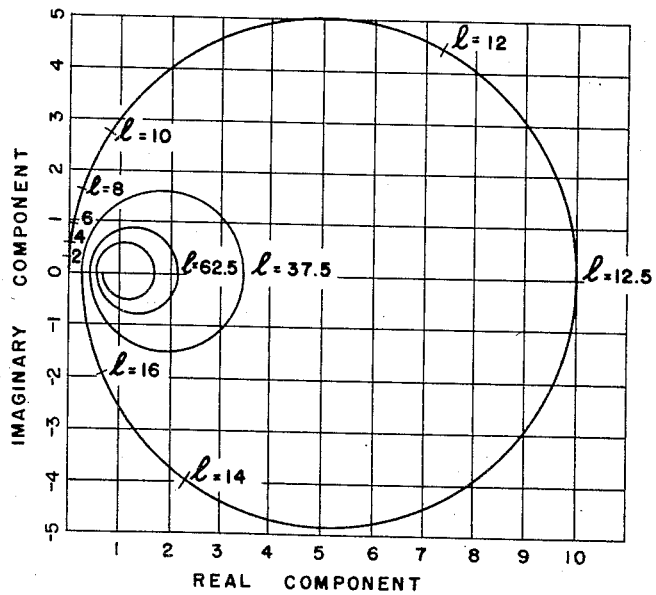
FIG. 4
INVENTORS
FRANK H. SLAYMAKER
BY WILLARD F. MEEKER
D. Clyde Jones
ATTORNEY

INVENTORS
FRANK H. SLAYMAKER
BY WILLARD F. MEEKER

D. Clyde Jones
ATTORNEY

July 4, 1950  F. H. SLAYMAKER ET AL  2,514,344
ADJUSTABLE ACOUSTIC IMPEDANCE
Filed July 10, 1944  5 Sheets-Sheet 4
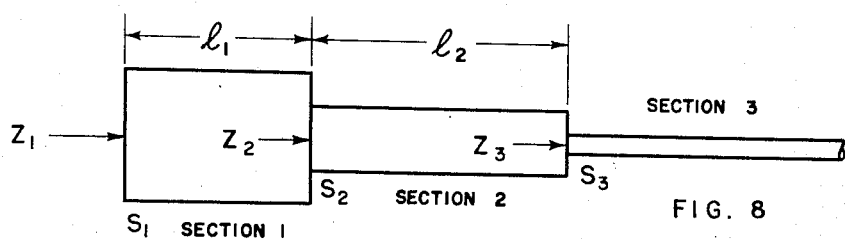
FIG. 8
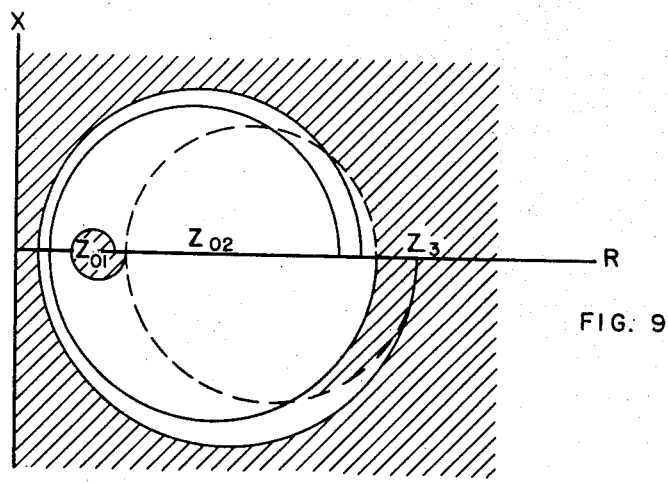
FIG. 9
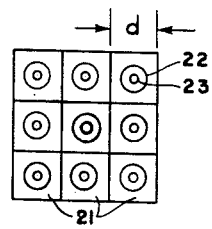
FIG. 10a  $d \leq \lambda$
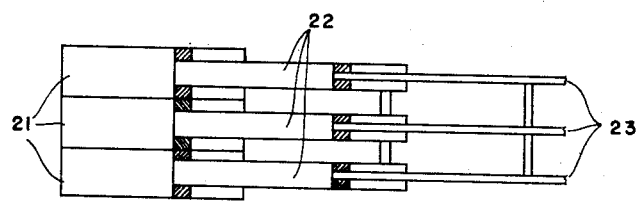
FIG. 10b
INVENTORS
FRANK H. SLAYMAKER
BY WILLARD F. MEEKER
D. Clyde Jones
ATTORNEY

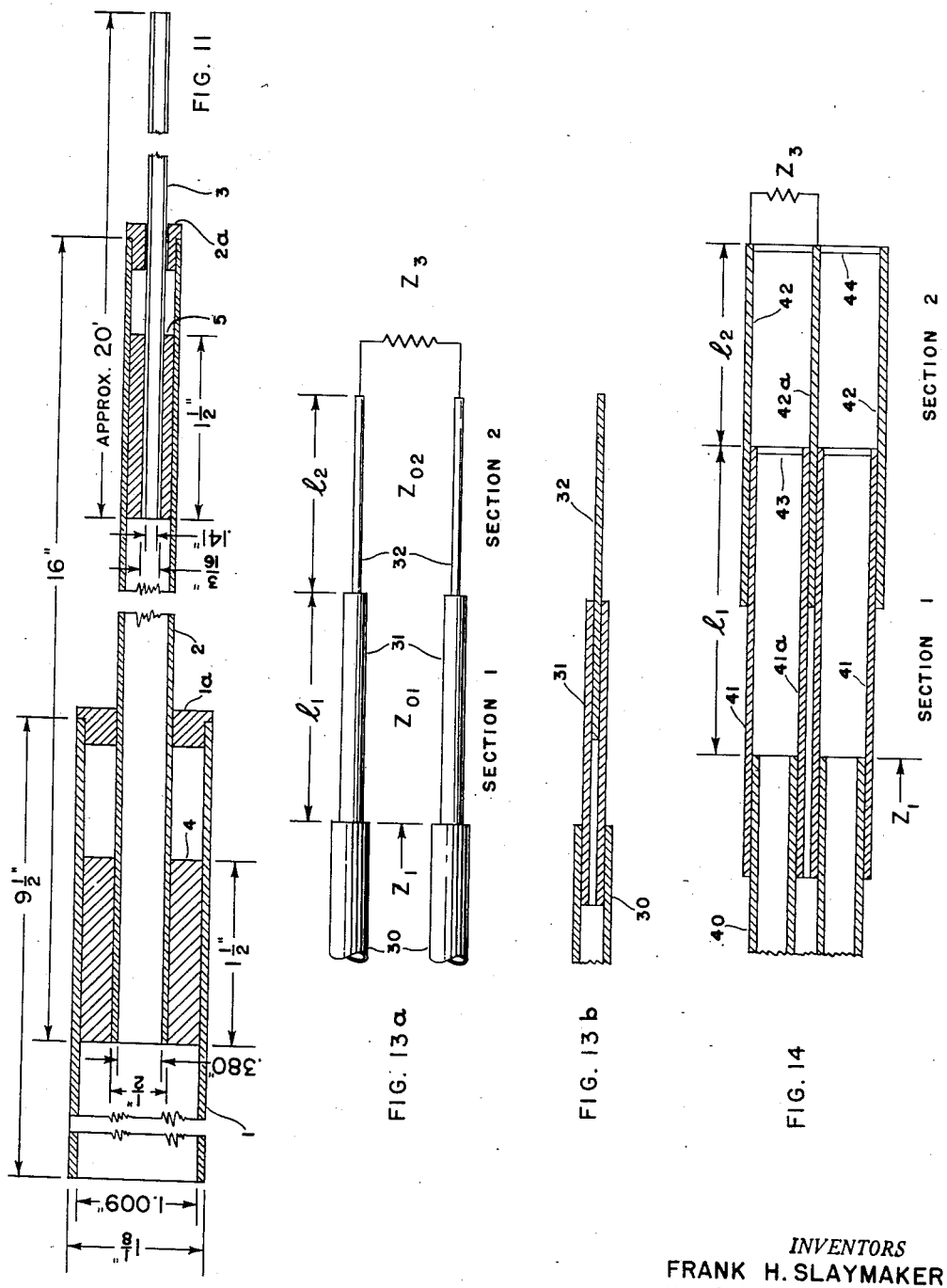

Patented July 4, 1950

2,514,344

UNITED STATES PATENT OFFICE 2,514,344

ADJUSTABLE ACOUSTIC IMPEDANCE

Frank H. Slaymaker and Willard F. Meeker, Rochester, N. Y., assignors to Stromberg-Carlson Company, Rochester, N. Y., a corporation of New York Application July 10, 1944, Serial No. 544,314

6 Claims. (Cl. 181—.5)

This invention relates to an adustable acoustic impedance device for use as an acoustical standard, the principle of which is applicable to a variable acoustical impedance.

Acoustical measurements have long been handicapped by the restricted range of known acoustical impedances available. The impedances which have been used may be generally classified in two groups. The first group includes slits, closed tubes of various lengths and cross sections and also long tubes damped with tufts of felt or similar material. However, each of these units has a very limited range of impedance values available with a given structure and consequently requires a great many different units to cover any appreciable range of impedance. The second group includes tubular devices acoustically closed at one of their ends and terminated at their other ends by a layer of felt or other acoustic absorption material or else by a closure having one or more adjustable orifices. The devices of the latter group have the obvious disadvantage of requiring calibration and also are limited in the range of impedances available without structural changes therein.

The present invention provides a simple, effective, adjustable, acoustic impedance which overcomes many of the disadvantages and shortcomings of former devices.

For a clearer understanding of the invention, reference is made to the drawings in which:

Figs. 3, 4, 5, 6, 7, 9 and 12 are graphs useful in explaining the invention;

Fig. 8 is a diagram of the acoustic impedance device shown in Fig. 1;

Figs. 10a and 10b are respectively an end view and a longitudinal section of a multi-unit acoustical impedance useful where the desired impedance must cover a large area.

Fig. 11 is a longitudinal section drawn generally to scale and indicating dimensions of a variable acoustic impedance the range of which is indicated in Fig. 12;

Figs. 13a, 13b and 14 show the invention applied to a variable electrical impedance, Figs. 13a and 13b, illustrating the invention applied to open wire radio frequency lines and Fig. 14 illustrates the invention applied to coaxial electrical transmission lines.

Figure 1:
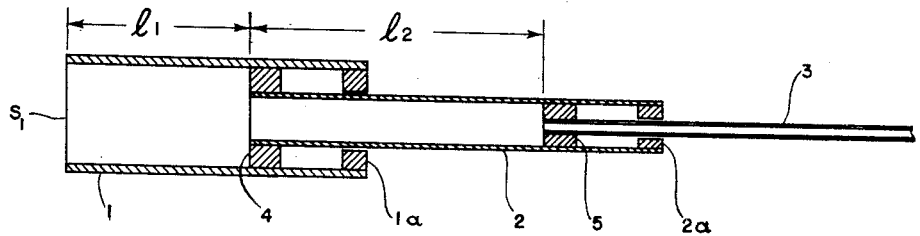
Fig. 1 is a longitudinal section of an acoustic impedance of the present invention.

One embodiment of the adjustable acoustic impedance of this invention consists of three substantially rigid sections of tubing 1, 2 and 3, as shown in Fig. 1. Each of these sections has a longitudinal passage extending therethrough of substantially the same cross section throughout. Each passage is substantially smaller in cross section than the preceding one. Sections 1 and 2 are metal and are provided respectively with attached sleeves 1a and 2a through which the sections 2 and 3 are adapted to slide, thereby providing means adjacent the overlapping end of section 1 to guide the adacent section 2. Section 3 is made of plastic material, known as "Saran," but could be metal. The adacent section having the smaller passage has an end portion of substantially the same external dimensions as the dimensions of the adjacent larger passage, the end portion cooperating with the adjacent passage to provide an abrupt and substantial change of cross-sectional area at the junction between adjacent passages whereby substantial reflections are set up at the junction. Thus, for example, section 2 is fitted with an attached collar 4 sliding within section 1 which permits an acoustically tight connection with section 1 and also permits adjustment of the length $l_1$. Similarly, section 3 is connected to section 2 by means of such a collar 5, thus permitting adjustment of $l_2$. Sections 1 and 2 have a smooth inside finish and are lubricated so that the acoustical seal between the three sections is not broken when the lengths are adjusted. Section 3 is a tube of small diameter and acoustically infinite length; that is, of such length that opening or closing the far end has no effect upon the impedance which it presents to section 2.

Theory

The theory of the variable acoustic impedance may best be approached in steps, as follows:

(1) Determine impedance terminating section 2.
(2) Determine relation between the input impedance of section 2 (terminated with a known impedance from step (1)) and its length.
(3) Determine relation between the input impedance of section 3 (terminated with a known impedance from step (2)) and its length.

It is apparent that steps (2) and (3) are fundamentally the same problem; that is, the determination of the relation between the input impedance of a tube, terminated with a known impedance, and its length. This relation has been determined for plane waves and may be written, $$Z(l) = Z_0 \frac{Z_R \cosh \gamma l + Z_0 \sinh \gamma l}{Z_0 \cosh \gamma l + Z_R \sinh \gamma l} \quad (1)$$

where $Z(l)$ = the acoustic impedance at the opening of the tube
$Z_0$ = the characteristic impedance of the tube (defined hereinafter by Equation 17)
$Z_R$ = the acoustic impedance terminating the tube
$l$ = length of tube
$\gamma = \alpha + j\beta$ = propagation constant Equation 1 is of the same form as the equation for the input impedance of a length of electrical transmission line, where $\alpha$ is the attenuation constant and $\beta$ is the wave length or phase constant. Because of the analogy with an electrical transmission line, we are free to apply any of the mathematical treatment customarily applied to electrical transmission lines.

If we define a quantity $$\gamma_R = \alpha_R + j\beta_R = \tanh^{-1} \frac{Z_R}{Z_0} \quad (2)$$

Equation 1 reduces to $$Z(l) = Z_0 \tanh (\gamma l + \gamma_R) = Z_0 \tanh [(\alpha l + \alpha_R) + j(\beta l + \beta_R)] \quad (3)$$

A convenient way to study Equation 3 is to consider first the hyperbolic tangent of a complex number, then the case where $Z_0$ is real and finally the case where $Z_0$ is complex.

First we will consider $$A + jB = \tanh (\alpha l + j\beta l) \quad (4)$$

Figure 3:
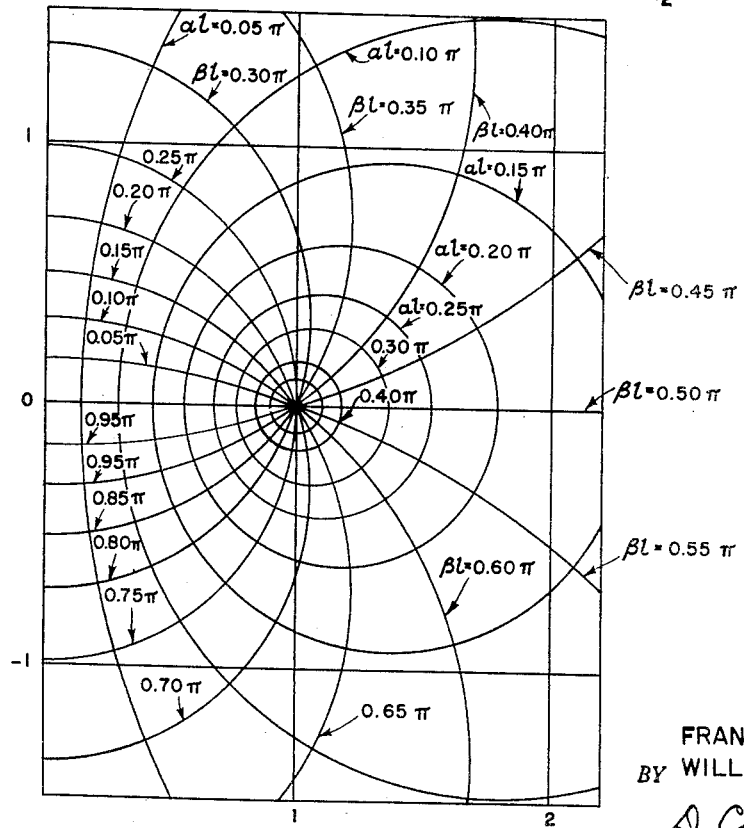

It is known that on a plot of A vs. B, lines of constant $\alpha l$ and lines of constant $\beta l$ appear as circles. (See Fig. 3.) Note from Fig. 3 that an increase of $\pi$ in $\beta l$ carries a point completely around a circle of constant $\alpha l$. We shall see later that for tubes and transmission lines $$\beta \doteq \frac{2\pi}{\lambda}$$

If $\beta$ equals $$\frac{2\pi}{\lambda}$$

it can be seen that an increase in $l$ of $\lambda/2$ will result in one complete revolution about the point $(1, 0)$. This is found by letting $$\left(\frac{2\pi}{\lambda}\right) l = \pi$$

from which $$l = \frac{\lambda}{2}$$

However, in Equations 3 and 4 $\alpha l$ and $\beta l$ both increase as $l$ is increased. Hence, a plot of a numerical example of Equation 4 will be helpful. In Fig. 4 we have plotted the imaginary component (B) of $$\tanh (.008 \, l + j \, .1257 \, l)$$

against its real component (A) for values of $l$ from $l=0$ to $l=100$. It is seen that the resulting curve is a spiral approaching the point $A=1$, $B=0$. If instead of Equation 4 we plot $$A + jB = \tanh [(\alpha l + \alpha_R) + j(\beta l + \beta_R)] \quad (5)$$

we again have a spiral about the point $A=1$, $B=0$, but the starting point is determined by $\alpha_R$ and $\beta_R$ and is (from (5), letting $l=0$)

$$A_R + jB_R = \tanh (\alpha_R + j\beta_R) \quad (6)$$

This is illustrated in Fig. 5 where we have plotted the imaginary component (B) against the real component (A) of $$\tanh [(.008 \, l + .12) + j \, (.1257 \, l + 1.477)]$$

where the starting point as determined from (6) is $$\tanh (.12 + j \, 1.477) = 5.19 + j \, 4.01$$

Next consider the case of Equation 3 where $Z_0$ is real; that is $$Z_0 = R_0 \quad (7)$$

Equation 3 becomes $$Z(l) = R(l) + jX(l) = R_0 \tanh [(\alpha l + \alpha_R) + j(\beta l + \beta_R)] \quad (8)$$

It is evident that a plot of $R(l)$ and $X(l)$ will again be a spiral since both components are multiplied by the same factor $R_0$. This spiral will now approach the point $R = R_0$, $X = 0$. The starting point of the spiral (R', X') is given by $$R' + jX' = R_0 \tanh (\alpha_R + j\beta_R) \quad (9)$$

but by definition $$\alpha_R + j\beta_R = \tanh^{-1} \frac{R_R + jX_R}{R_0} \quad (10)$$

Hence the starting point is the point $R = R_R$, $X = X_R$. This is illustrated in Fig. 6 which is a plot of $$R(l) + jX(l) = 10 \tanh (.008 \, l + .12) + j \, (.1257 \, l + 1.477)$$

and is obtained from Fig. 5 merely by multiplying the coordinates by the factor 10. The starting point is now given by $$R_R + jX_R = 10 \tanh (.12 + j \, 1.477)$$
$$= 10 \, (5.10 + j \, 4.01)$$
$$= 51.0 + j \, 40.0$$

Figure 2:
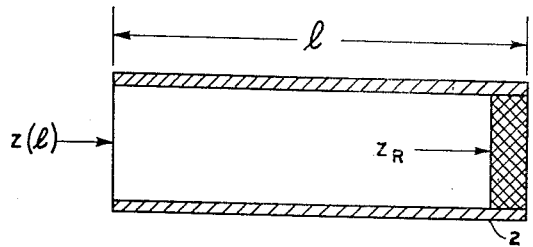
Fig. 2 is a cross section of an impedance unit employed in explaining the theory of the invention.

This is the value of the terminating impedance. It should be remembered here that the spiral of Fig. 6 is the path of a point representing the acoustic impedance looking into the open end of the tube of Fig. 2 as the length is varied. The point is at $R = R_R$, $X = X_R$ when $l=0$ and spirals around the point $R = R$, $X = 0$ as $l$ increases.

We have now to consider the general case where $Z_0$ is complex; that is $$Z_0 = R_0 + jX_0 \quad (11)$$

We may write this $$Z_0 = |Z_0| e^{j\theta} \text{ where } \theta = \tan^{-1} \frac{X_0}{R_0} \quad (12)$$

Then Equation 3 becomes $$Z(l) = |Z_0| e^{j\theta} \tanh [(\alpha l + \alpha_R) + j(\beta l + \beta_R)] \quad (13)$$

Consider first $$|Z_0| \tanh [(\alpha l + \alpha_R) + j(\beta l + \beta_R)]$$

We have seen (Fig. 6) that if we plot the reactive term against the resistive term we obtain a spiral. The starting point is obtained by substituting the value of $\alpha_R + j\beta_R$ from Equation 2 and letting $l=0$ and is $$|Z_0| \tanh \left[ \tanh^{-1} \frac{Z_R}{Z_0} \right] = |Z_0| \frac{Z_R}{Z_0} \quad (14)$$

The spiral approaches the point $(|Z_0|, 0)$.

The effect of the $e^{j\theta}$ term is to rotate every point on the spiral through the angle $\theta$ about the origin. This obviously does not change the shape of the spiral. Instead of replotting the spiral, we can just as well rotate the coordinate system through the angle $(-\theta)$. The original spiral referred now to the rotated coordinate system $R'$, $X'$ shows the relation between the resistive and reactive terms of Equation 13 as $l$ increases from 0. The spiral begins at the point $(R_R, X_R)$ and approaches the point $(R_0, X_0)$, all points referred to the rotated coordinate system $R'$, $X'$.

As an example consider a case where $$Z_0 = 10\underline{/10°} = 9.84 + j1.737$$
$$Z_R = 65.5\underline{/47.7°} = 44.1 + j48.5$$
$$\alpha + j\beta = .008 + j.1257$$

then $$\alpha_R + j\beta_R = \tanh^{-1}\frac{Z_R}{Z_0} = \tanh^{-1}\frac{65.5\underline{/47.7°}}{10\underline{/10°}} = .12 + j1.477$$

The input impedance is then $$Z(l) = 10e^{j100}\tanh[(.008l + .12) + j(.1257l + 1.477)]$$

Considering first $$10\tanh[(.008l+.12)+j(.1257l+1.477)]$$

Figure 7:
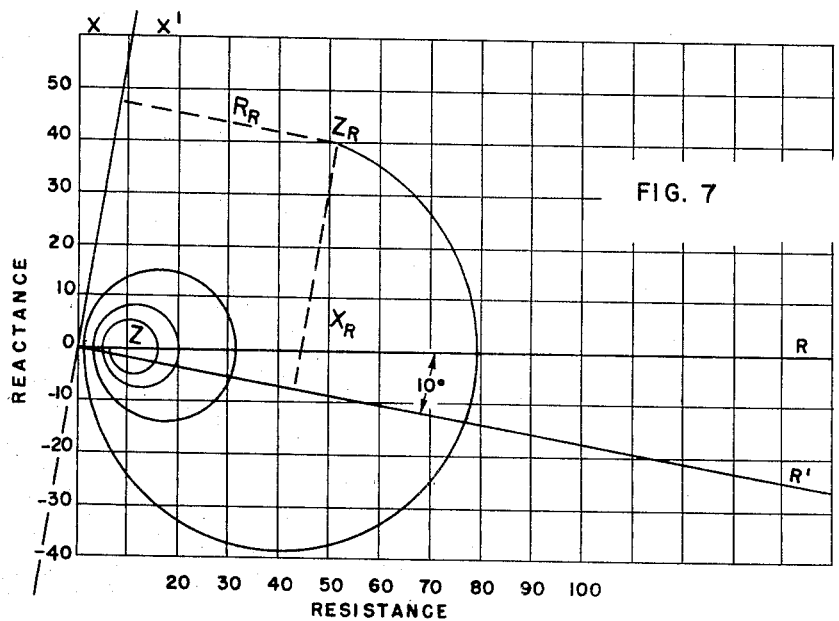

This is the spiral which we have plotted in Fig. 6 and is again replotted in Fig. 7.

If now we draw a new coordinate system $R'$, $X'$ rotated through an angle $(-10°)$ from the original coordinate system and refer the above spiral to the new coordinate system, it will then be a plot of the resistive and reactive terms of $$Z(l) = 10e^{j100}\tanh[(.008l+.12)+j(.1257l+1.477)]$$

The value of $\alpha$ used in the preceding examples is larger than that of typical transmission lines, but was selected to show that the spiral approaches the point $Z_0$.

We now have sufficient information to explain the action of the variable acoustic impedance. Fig. 8 is a diagrammatic sketch of the variable acoustic impedance.

Let $Z_1$ = input impedance of the device
$S_1$ = area of section 1
$l_1$ = length of section 1
$Z_{01}$ = characteristic impedance of section 1
$\gamma_1 = \alpha_1 + j\beta_1$ = propagation constant of section 1
$Z_2$ = impedance terminating section 1
   = input impedance of section 2
$S_2$ = area of section 2
$l_2$ = length of section 2
$Z_{02}$ = characteristic impedance of section 2
$\gamma_2 = \alpha_2 + j\beta_2$ = propagation constant of section 2
$Z_3$ = impedance terminating section 2
   = input impedance of section 3
$S_3$ = area of section 3
$Z_{03}$ = characteristic impedance of section 3

$$\gamma_{R1} = \alpha_{R1} + j\beta_{R1} = \tanh^{-1}\frac{Z_2}{Z_{01}}$$
$$\gamma_{R2} = \alpha_{R2} + j\beta_{R2} = \tanh^{-1}\frac{Z_3}{Z_{02}}$$

If section 3 is acoustically very long, $Z_3$ will be substantially equal to $Z_{03}$. The impedances $Z_{01}$, $Z_{02}$, and $Z_{03}$ will in most cases have only very small reactive terms and for illustrative purposes in Fig. 9 they will be assumed real. Also in most cases $\beta$ is very nearly equal to $$\frac{2\pi}{\lambda}$$

The impedance terminating section 1 is (from Equation 3)

$$Z_2 = Z_{02}\tanh(\gamma_2 l_2 + \gamma_{R2}) \quad (13)$$

We have seen that a plot of the reactive term vs. the resistive term of Equation 13 is a spiral; this is indicated by the dotted line in Fig. 9, where $l_2$ passes through all values from 0 to $\lambda/2$. The impedance terminating Section 1 then may have any value on the dotted spiral of Fig. 9 by the proper setting of $l_2$.

The input impedance of the device is (from Equation 3)

$$Z_1 = Z_{01}\tanh(\gamma_1 l_1 + \gamma_{R1}) \quad (14)$$

and this also is a spiral. But we have seen (Equation 10) that the spiral begins at the point $R=R_2$, $X=X_2$ which from Equation 13 lies somewhere on the dotted spiral. It is evident then that in setting $l_2$ and then varying $l_1$, a series of spirals results, the starting point of each lying on the dotted spiral. Some of the spirals are indicated by the full lines on Fig. 9. By following this line of reasoning it can be seen that it is possible to obtain any input impedance which lies in the unshaded area of Fig. 9 by adjustment of $l_1$ and $l_2$ within the range 0 and $\lambda/2$.

The input impedance of the device is, upon expanding Equation (14)

$$Z_1 = Z_{01}\tanh\left[\gamma_1 l_1 + \tanh^{-1}\frac{Z_{02}}{Z_{01}}\tanh\left[\gamma_2 l_2 + \tanh^{-1}\frac{Z_3}{Z_{02}}\right]\right] \quad (15)$$

It should be noted that while $Z_{01}$, $Z_{02}$, and $Z_3$ have been assumed real in Fig. 9, the reasoning applied and Equation 15 are general and may be applied for any values of $Z_{01}$, $Z_{02}$, and $Z_3$. Equation 15 contains enough information to determine the settings of $l_1$, and $l_2$ for a given input impedance $Z_1$, since by equating the real parts of both sides of the equation and then imaginary parts, we obtain two equations in two unknowns.

The propagation constant has been determined by others to be $$\gamma = \sqrt{-\frac{\omega^2}{c^2}\left[\left(1+\frac{P}{S}\sqrt{\frac{\gamma'^2}{2\omega\rho}}\right)-j\frac{P}{S}\sqrt{\frac{\gamma'^2}{2\omega\rho}}\right]} \quad (16)$$

where $\omega = 2\pi f$
$f$ = frequency, cycles per second
$c$ = velocity of sound, centimeter per second
$P$ = perimeter of tube, centimeters
$S$ = area of tube, square centimeters
$\rho$ = density, grams per square centimeter $$\gamma' = \sqrt{\frac{\mu}{\rho}} + \left(\sqrt{\gamma_s} - \frac{1}{\sqrt{\gamma_s}}\right)\sqrt{\gamma}$$

$\mu$ = coefficient of viscosity of the medium
$\gamma_s$ = ratio of specific heats
$\gamma$ = coefficient of heat conductivity of the medium The characteristic impedance of a tube is $$Z_0 = \frac{P_0 \gamma_s}{j\omega s}\gamma \quad (17)$$

where $P_0$ = mean pressure, dynes per square centimeter

All of the preceding theory applies only for the condition of plane waves in the tubes. It has also been shown that for a circular tube the condition for plane waves is $$D \leq \frac{3.832}{\pi}\lambda \quad (18)$$

where $D$ = diameter of the tube
$\lambda$ = wavelength of the sound

Hence, the largest of the tubes should not have a diameter much larger than the wave length. If a variable acoustic impedance is required over a larger area than Equation 18 permits, this may be accomplished by combining units which do not meet the requirement of Equation 18 until the area required is obtained. One way in which this may be done is indicated in Figs. 10a and 10b. Here a number of identical units 21, 22 and 23 are used, each having a square tube 21 for section 1 so that they may be combined to cover as large an area as desired. They are clamped together in such a way that all the units 22 in section 2 move together and all the units 23 of section 3 move together. Each of the tubes of section 1 is made small enough to meet the requirement for plane waves.

The acoustic input impedance over the total area $S_t$ is then $$Z \text{ input} = \frac{S}{S_t} Z \qquad (20)$$

where

S=area of cross-section of one tube
Z=acoustic input impedance of one tube

The important dimensions of a variable acoustic impedance which has been built are shown in Fig. 11. While the range of impedances which it is possible to obtain varies somewhat with frequency, due to the variation in the propagation constant and in tube length required for a given portion of a wave length, the variation in the range of impedances with frequency is not great. Hence an example, at one frequency will serve to indicate the order of magnitude of impedances obtainable.

Figure 12:
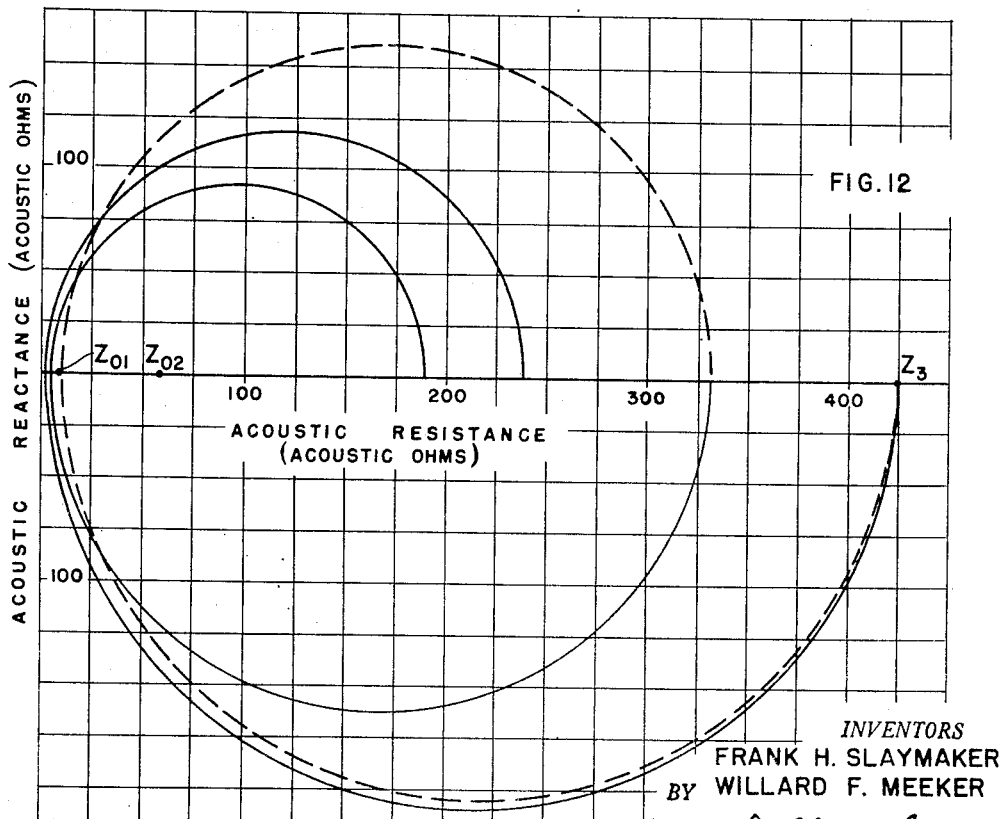

Fig. 12 is a spiral diagram similar to Fig. 9 showing the range of impedances obtainable with the dimensions shown in Fig. 11.

The dotted spiral corresponds to $Z_2$, the input impedance of section 2, while the full spirals correspond to $Z_1$, the input impedance of the device for the terminating impedances indicated. Note that since the dotted spiral does pass through the point $Z_{01}$, there is a small region about $Z_{01}$, containing impedances which cannot be obtained with only half-wave sections.

It has been pointed out above that transmission of sound in tubes is analogous to the transmission of electrical energy by electrical transmission lines. This analogy leads to an electrical device similar to the variable acoustic impedance, consisting of two sections of transmission line having different characteristic impedances connected in series as shown in Figs. 13a and 13b. That is, if we have two transmission lines 31 and 32 which may be connected in series so that the length of each is separately adjustable and this combination terminated in some impedance, we have a device which is, mathematically, exactly like the variable acoustic impedance, and the input impedance is given by Equation 15 where the symbols refer to the constants of electrical transmission lines rather than acoustic tubes.

One form of such a device for open wire radio frequency lines is shown in Fig. 13.

As can be seen from the cross section (Fig. 13b) $l_1$ and $l_2$ are adjustable and have different characteristic impedances. The characteristic impedance of an open wire line is $$Z_0 = 120 \cosh^{-1} \frac{D}{d}$$

where

D=distance between centers
d=diameter of wire

Hence the change in diameter of the conductor produces a change in characteristic impedance of the line.

Another form of this device, in this case made up of coaxial lines, is shown in Fig. 14.

This arrangement permits independent adjustment of the length of sections 1 and 2, designated 41 and 42. Also, sections 1 and 2 have different characteristic impedances, given by $$Z_0 = 138 \log_{10} \frac{D}{d}$$

where

D=inside diameter of outer conductor
d=outside diameter of inner conductor

The extra section of line, such as 30 and 40, at the input is necessary in both the above cases in order to permit adjustment of the length of the first section. By making it a half-wave-length, it could be neglected in the analysis if its attenuation is negligible. The insulating disks 43 and 44 are required to move the inner conductors 41a and 42a along with the outer conductors 41 and 42 respectively.

In the types of radio frequency lines shown it is usually possible to neglect the effect of attenuation. This results in simplification of the analysis, but this case is just a special case of the general analysis above. However, since in this case there is very little loss in the line itself, it is possible to use the devices shown in Figs. 13a, 13b and 14 to match a load impedance to a generator impedance to permit maximum power transfer. In this case, it would not be necessary to make the lengths of sections 1 and 2 adjustable, since they could be calculated for any given case and made a fixed length. The characteristic impedances of the two sections bear no fixed relation to the impedances to be matched, the only requirement being the inclusion of the desired input impedance in the range over which the impedance may be varied.

It should be noted that the above means of impedance matching or of obtaining a variable impedance applies to any type of transmission line whose impedance may be expressed in the form of Equation 1.

What we claim is:

1. An adjustable acoustic impedance device comprising a plurality of units, each unit having three tubular sections, each of said sections being substantially smaller in diameter than the preceding one, said sections being arranged to telescope one within another, means for providing an acoustically tight fit at the junctions of each of said sections at all positions of said sections, the smallest diameter section being, in effect, acoustically infinite in length, the largest section being rectangular in cross section whereby said units can be arranged with the largest sections in contact with each other so that their combined open ends cover a desired area, and means for simultaneously adjusting the effective lengths of all except the smallest diameter sections.

2. An adjustable acoustic impedance device for use as an acoustical standard which is adjustable over a relatively wide range of frequencies comprising a plurality of substantially rigid tubular sections, each of said sections having a longitudinal passage extending therethrough of substantially the same cross section throughout, each of said sections having telescopic relationship with the adjacent section whereby all but the smallest of said passages is adjustable in effective length, each of said passages being substantially smaller in cross section than the preceding one and the adjacent section having the smaller passage having an end portion cooperating with the inside surface of the adjacent larger passage to provide an acoustically tight connection therewith and to provide an abrupt and substantial change of cross-sectional area at the junction between adjacent passages whereby substantial reflections are set up at said junctions, means adjacent the overlapping end of each section to provide a guide for the adjacent section containing the smaller passage, and one of said sections terminating in an acoustic impedance other than its characteristic impedance.

3. An adjustable acoustic impedance device for use as an acoustical standard which is adjustable over a relatively wide range of frequencies comprising a plurality of substantially rigid tubular sections, each of said sections having a longitudinal passage extending therethrough of substantially the same cross section throughout, each of said sections having telescopic relationship with the adjacent section whereby all but the section having the smallest passage is adjustable in effective length, each of said passages being substantially smaller in cross section than the preceding one and the adjacent section having the smaller passage having an end portion cooperating with the inside surface of the adjacent larger passage to provide an acoustically tight connection therewith and to provide an abrupt and substantial change of cross-sectional area at the junctions between adjacent passages whereby substantial reflections are set up at said junctions, means adjacent the overlapping end of each section to provide a guide for the adjacent section containing the smaller passage, the section having the smallest passage terminating in an acoustic impedance other than its characteristic impedance.

4. An adjustable acoustic impedance device for use as an acoustical standard which is adjustable over a relatively wide range of frequencies comprising a plurality of substantially rigid tubular sections, each of said sections having a longitudinal passage extending therethrough of substantially the same cross section throughout, each of said passages having telescopic relationship with the adjacent section, whereby all but the smallest passage is adjustable in effective length, there being an abrupt and substantial change of cross-sectional area at the junction of adjacent passages whereby substantial reflections are set up at said junctions, and means for providing an acoustically tight fit at the junctions of each of said sections at all positions of said section, one of said sections terminating in an acoustic impedance other than its characteristic impedance.

5. An adjustable acoustic impedance device for use as an acoustical standard comprising three substantially rigid sections, each of said sections having a longitudinal passage extending therethrough of substantially the same cross section throughout, each of said passages being substantially smaller in cross section than the preceding one, the adjacent section having the smaller passage being provided with an end portion extending into the adjacent larger passage in telescopic relationship therewith for changing the effective length of all but the smallest passage, said end portion also being of substantially the same external dimensions as the dimensions of the passage through the preceding section in order to provide an abrupt and substantial change of cross-sectional area whereby substantial reflections are set up at the junctions between adjacent sections, the section having the smallest passage being, in effect, acoustically infinite in length.

6. An adjustable acoustic impedance device for use as an acoustical standard comprising three substantially rigid sections, each of said sections having a longitudinal passage extending therethrough of substantially the same cross section throughout, each of said passages being substantially smaller in cross section than the preceding one, the adjacent section having the smaller passage being provided with an end portion extending into the adjacent larger passage in telescopic relationship therewith for changing the effective length of all but the smallest passage and to provide an abrupt and substantial change of cross-sectional area whereby substantial reflections are set up at the junctions between adjacent sections, means for providing an acoustically tight fit at the junctions of each of said sections at all positions of said sections, the section having the smallest passage being, in effect, acoustically infinite in length, and the cross section of the passage through the largest section being not substantially greater than the wavelength of the sounds being measured.

FRANK H. SLAYMAKER.
WILLARD F. MEEKER.

REFERENCES CITED

The following references are of record in the file of this patent:

UNITED STATES PATENTS

| Number | Name | Date |
|---|---|---|
| 80,557 | Miller | Aug. 1, 1868 |
| 1,170,800 | Cheney | Feb. 8, 1916 |
| 1,781,469 | Mason | Nov. 11, 1930 |
| 1,795,647 | Flanders | Mar. 10, 1931 |
| 1,795,874 | Mason | Mar. 10, 1931 |
| 1,921,117 | Darbord | Aug. 8, 1933 |
| 1,927,393 | Darbord | Sept. 19, 1933 |
| 1,929,878 | Clavier | Oct. 10, 1933 |
| 2,127,408 | Kaar | Aug. 16, 1938 |
| 2,225,312 | Mason | Dec. 17, 1940 |
| 2,273,465 | Carter | Feb. 17, 1942 |

OTHER REFERENCES

Olson, "Elements of Acoustical Engineering," D. Van Nostrand Co. Inc., New York, 2d edition, pp. 117, 118, September 1947, first published April 1940.

Steward and Lindsay, "Acoustics," D. Van Nostand Co. Inc., New York, 1930, pp. 87, 88.

Certificate of Correction

Patent No. 2,514,844                                                    July 4, 1950

FRANK H. SLAYMAKER ET AL.

It is hereby certified that error appears in the printed specification of the above numbered patent requiring correction as follows:

Column 5, lines 20 and 32, for that portion of each equation reading "$10e^{j100}$" read *$10e^{j10°}$*; column 7, line 45, after the word "does" insert *not*;

and that the said Letters Patent should be read as corrected above, so that the same may conform to the record of the case in the Patent Office.

Signed and sealed this 21st day of August, A. D. 1951.

[SEAL]

THOMAS F. MURPHY,
                                                                         *Assistant Commissioner of Patents.*